United States Patent [19]

Carbol

[11] 4,381,347
[45] * Apr. 26, 1983

[54] FIBRE GLASS COMPOSITION

[75] Inventor: Vlastimil Carbol, Vaxjo, Sweden

[73] Assignee: Oy Partek AB, Pargas, Finland

[*] Notice: The portion of the term of this patent subsequent to Jan. 26, 1999, has been disclaimed.

[21] Appl. No.: 281,143

[22] Filed: Jul. 7, 1981

Related U.S. Application Data

[63] Continuation-in-part of Ser. No. 139,423, Apr. 11, 1980, Pat. No. 4,312,952.

[51] Int. Cl.³ .................. C03C 3/08; C03C 13/00
[52] U.S. Cl. ........................... 501/36; 501/67
[58] Field of Search ............. 501/35, 36, 37, 67

[56] References Cited

U.S. PATENT DOCUMENTS

| | | | |
|---|---|---|---|
| 2,877,124 | 3/1959 | Welsch | 501/38 |
| 4,177,077 | 12/1979 | Gagin | 501/35 |
| 4,264,131 | 4/1981 | Sawamura et al. | 501/37 |
| 4,312,952 | 1/1982 | Carbol | 501/36 |

FOREIGN PATENT DOCUMENTS

| | | | |
|---|---|---|---|
| 19600 | 11/1980 | European Pat. Off. | 501/35 |
| 2029401 | 3/1980 | United Kingdom | 501/67 |

Primary Examiner—Helen M. McCarthy
Attorney, Agent, or Firm—Eugene E. Geoffrey, Jr.

[57] ABSTRACT

A fibre glass composition which is characterized in that it consists of

| | % by weight |
|---|---|
| $SiO_2$ | 55–65 |
| $Al_2O_3$ | 1–2 |
| CaO | 6–9.5 |
| MgO | 1–4.5 |
| $Na_2O$ | 13–17 |
| $K_2O$ | 0–2 |
| $B_2O_3$ | 1–7 |
| BaO | 0–3 |
| $Li_2O$ | 0–1 |
| $Fe_2O_3$ | traces |
| ZnO | 0.5–6. |

1 Claim, No Drawings

FIBRE GLASS COMPOSITION

This application is a continuation-in-part of U.S. patent application Ser. No. 139,423, filed Apr. 11, 1980, entitled "Fibre Glass Composition", now U.S. Pat. No. 4,312,952, granted Jan. 26, 1982.

This invention relates to a glass composition for the production of fibres for glass wool insulations. The glass composition according to the invention is especially suited for the so-called Johns-Manville fibre forming process which utilizes a process equipment incapable of withstanding excessive temperatures.

In the conventional production of such fibres, molten glass is extruded by centrifugal force through the apertures of a rotary spinner. In order to obtain satisfactory fibres, the glass should fulfil certain requirements. Thus, the melting temperature and the fibre forming temperature of the glass must be low, thereby to impart maximum life to the spinner. The melting temperature is indicated as the so-called log 2 temperature, i.e. the temperature at which the $^{10}$log of the viscosity of the glass, measured in poise (or deciPascalsecond, dPas) is 2, while the fibre forming temperature is correspondingly given as the log 3 temperature. If the log 2 and log 3 temperatures can be lowered, this will increase the life of the spinner, and the production stops necessitated by the exchange of the spinners will be less frequent. Already a lowering of the log 2 and log 3 temperatures by five or ten °C. constitutes a considerable improvement. However, a lowering of only the log 2 temperature and the log 3 temperature of the glass is not feasible since the other properties of the glass must also be taken into consideration.

Among the remaining important properties of the glass that must be taken into consideration, is the liquidus temperature, $L_T$, which is the temperature above which no crystallization occurs in the glass. To avoid crystallization of the glass in the spinner, the liquidus temperature must lie at least 50° C. below the log 3 temperature.

Another important property of the glass is its chemical resistance which is measured in accordance with standardized testing methods as the so-called hydrolytical resistance (P value or DGG value).

If it is desired to lower the melting temperature and the fibre forming temperature of the glass, the obvious thing is to increase the content of CaO, $Na_2O$, $K_2O$ or $B_2O_3$. However, an increase of the CaO content will result in an increase of the liquidus temperature of the glass, with the ensuing risk of crystallization in the spinner. An increased content of $Na_2O$, $K_2O$ or $B_2O_3$ reduces the chemical resistance of the glass. It will thus be obvious that there is little possibility of changing the composition in conventional manner to obtain improved properties in one respect, without simultaneously deteriorating the properties in some other respect.

The present invention, however, the characteristic features of which are stated in the appended claims, quite surprisingly yields a glass composition having essentially improved properties as compared with standard glass, and this is achieved by incorporating ZnO and preferably also $Li_2O$ in the glass composition.

The invention is based on the fact that there exists between certain atomic types in the glass, such as Zn-Ca and Li-Na-K, a certain anomaly which is of decisive importance to the physical properties of the glass and which depends upon the ion radii of the atoms. To satisfy this anomaly, the difference between the ion radii must be greater than 0.3 Å. In order to improve the physical and chemical properties of the glass, this anomaly in the glass structure must be well satisfied, and this means that certain atoms should be included in the glass in a specific interrelationship.

In the light of these circumstances, the present invention proposes incorporating ZnO in the glass, thereby to change the physical and, in particular, the chemical properties of the glass. Furthermore, it is especially preferred to incorporate also from 0 to 1, preferably from 0.1 to 0.4% by weight of $Li_2O$ in the glass, whereby the anomaly is further improved, the viscosity is greatly reduced, and the chemical resistance of the glass is increased.

The fibre glass according to the present invention is characterised by a composition which, based on % by weight, lies within the following general limits:

|  | % by weight |
|---|---|
| $SiO_2$ | 55–65 |
| $Al_2O_3$ | 1–2 |
| CaO | 6–9.5 |
| MgO | 1–4.5 |
| $Na_2O$ | 13–17 |
| $K_2O$ | 0–2 |
| $B_2O_3$ | 1–7 |
| BaO | 0–3 |
| $Li_2O$ | 0–1 |
| $Fe_2O_3$ | traces |
| ZnO | 0.5–6. |

It is especially preferred that the glass composition according to the present invention lie within the following limits:

|  | % by weight |
|---|---|
| $SiO_2$ | 58–62 |
| $Al_2O_3$ | 1–2 |
| CaO | 8–9.5 |
| MgO | 2.3–3.5 |
| $Na_2O$ | 15–17 |
| $K_2O$ | 0–1 |
| $B_2O_3$ | 5–7 |
| BaO | — |
| $Li_2O$ | 0.1–0.4 |
| $Fe_2O_3$ | traces |
| ZnO | 1.5–3.5. |

By adding from 0.5 to 6, preferably from 1.5 to 3.5% by weight of ZnO, an excellent chemical resistance of the glass according to the invention is obtained. The chemical resistance was even found to be much better than when the same amount of, for example, titanium dioxide is added to the glass.

Generally, a high proportion of alkali in alkali borosilicate glass greatly reduces the chemical resistance of the glass, but if ZnO is supplied to such glass, the surprising result is that the glass may contain larger amounts of alkali without detriment to the chemical resistance.

The high alkali content, on its part, affects the viscosity of the glass according to the invention so that it will be more readily liquefiable, i.e. the log 2 and log 3 temperatures of the glass are lowered, and this brings a number of practical advantages, such as a lower fibre forming temperature, whereby the life of the fibre forming equipment will be extended and power can be saved. The lower fibre forming temperature also gives a product of higher quality. Furthermore, the glass according to the invention shows a lowering of the liquidus temperature as compared with conventional glass, as a result of which the risk of crystallization of the glass in the spinner is conspicuously reduced or even eliminated. In addition, the glass according to invention has excellent chemical resistance, as will appear from the values of hydrolytical resistance in the following Examples. A further advantage of the present invention is that readily available and inexpensive ZnO-containing starting material may be used. Thus, there is no need to use absolutely pure ZnO as the starting material for the ZnO content of the glass, and any ZnO-containing material can be used.

To illustrate the present invention, the following non-restrictive Examples are given.

EXAMPLES 1–4

Three ZnO-containing glasses according to the present invention were produced. For the purpose of comparison, a conventional alkali borosilicate glass was produced which is used in actual practice and which in the following is referred to as "standard glass".

The compositions of the standard glass and the glass according to the present invention, like the properties of the glasses with respect to log 2, log 3, $L_T$, liquidus viscosity and chemical resistance ($P_\nu$SIS 136 321) will appear from Table 1.

TABLE 1

| Oxide | Example 1 (standard glass) | Example 2 | Example 3 | Example 4 |
| --- | --- | --- | --- | --- |
| $SiO_2$ | 63.0 | 62.6 | 59.2 | 56.4 |
| $Al_2O_3$ | 2.5 | 1.5 | 1.5 | 1.5 |
| CaO | 8.8 | 9.1 | 9.1 | 9.1 |
| MgO | 3.5 | 3.5 | 3.5 | 3.5 |
| $Na_2O$ | 14.7 | 15.9 | 15.9 | 15.9 |
| $K_2O$ | 1.0 | 0.6 | 0.6 | 0.6 |
| $B_2O_3$ | 6.5 | 6.9 | 6.9 | 6.9 |
| BaO | — | — | — | — |
| $Li_2O$ | — | 0.2 | 0.2 | — |
| $Fe_2O_3$ | 0.2 | 0.1 | 0.1 | 0.1 |
| ZnO | — | 0.5 | 3.0 | 6.0 |
| log $\eta$ 2 (°C.) | 1270 | 1200 | 1187 | 1172 |
| log $\eta$ 3 (°C.) | 1060 | 997 | 992 | 990 |
| $L_T$ (°C.) | 960 | 948 | 920 | 913 |
| Liquidus visc. | 3.699 | 3.353 | 3.528 | 3.617 |
| $P_\nu$ SIS 136232 | 1.0 | 1.5 | 0.9 | 0.8. |

I claim:
1. Fibre glass composition, characterized in that it consists of

| | % by weight |
| --- | --- |
| $SiO_2$ | 55–65 |
| $Al_2O_3$ | 1–2 |
| CaO | 6–9.5 |
| MgO | 1–4.5 |
| $Na_2O$ | 13–17 |
| $K_2O$ | 0–2 |
| $B_2O_3$ | 1–7 |
| BaO | 0–3 |
| $Li_2O$ | 0–1 |
| $Fe_2O_3$ | traces |
| ZnO | 0.5–6. |

* * * * *